April 12, 1938.  H. P. PHILLIPS  2,113,857
INNER PISTON RING
Filed June 4, 1936
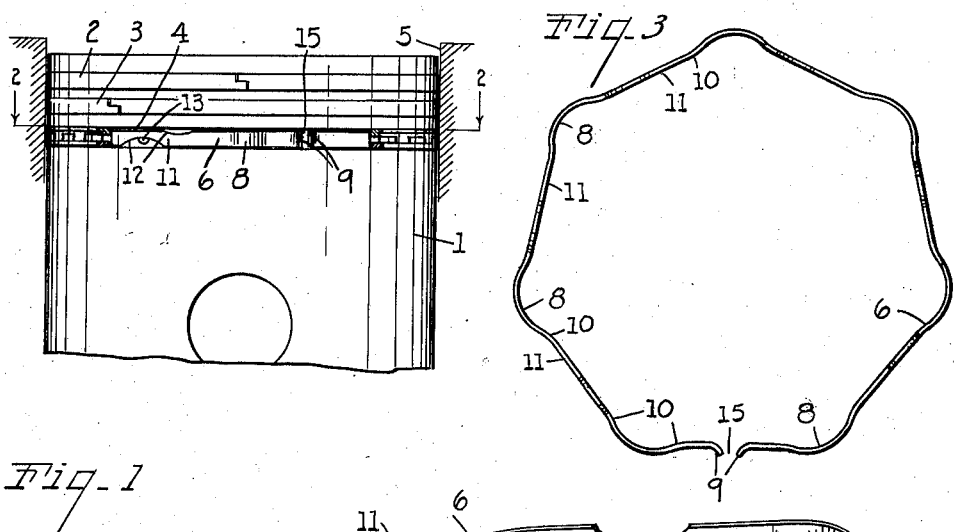
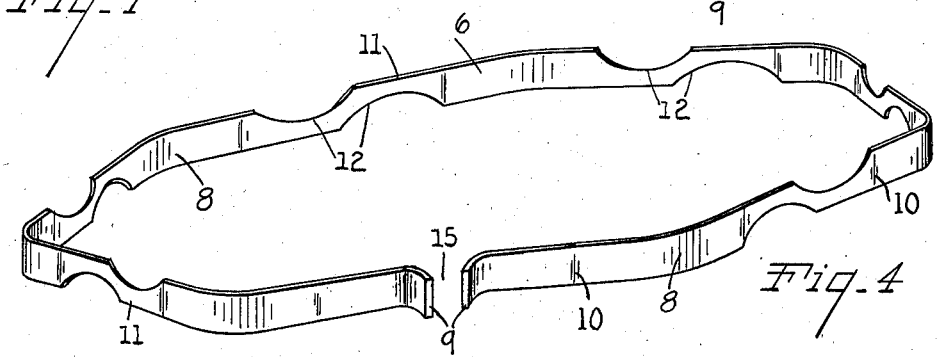
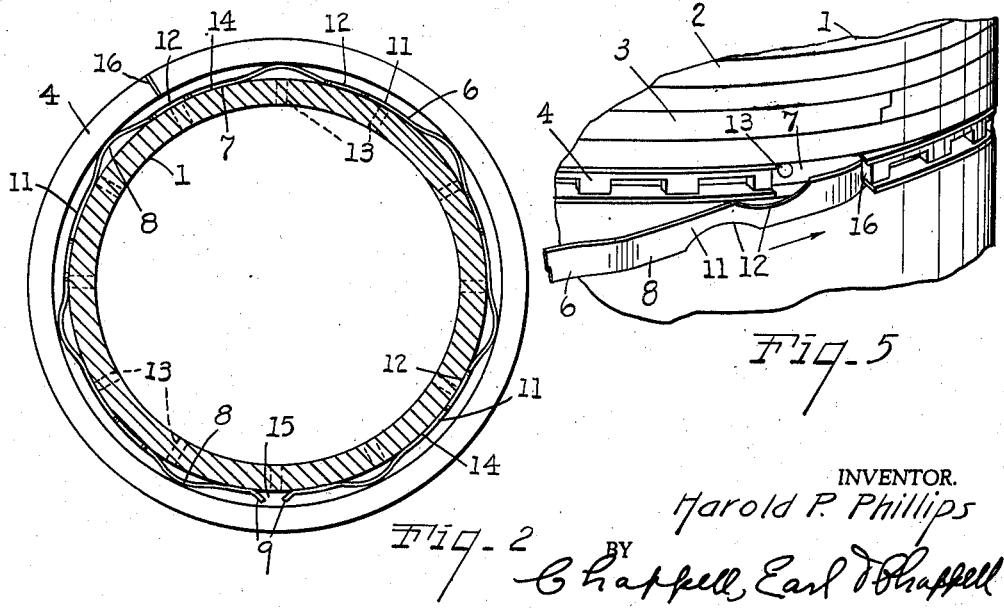
INVENTOR.
Harold P. Phillips
BY
Chappell, Earl Chappell
ATTORNEYS Patented Apr. 12, 1938

2,113,857

UNITED STATES PATENT OFFICE 2,113,857

INNER PISTON RING

Harold P. Phillips, Hastings, Mich., assignor to Hastings Manufacturing Company, Hastings, Mich.

Application June 4, 1936, Serial No. 83,460

3 Claims. (Cl. 309—43)

The main objects of my invention are:

First, to provide a flexible inner expanding ring for coaction with outer rings to centralize and increase the sealing pressure of the same and compensate for wear.

Second, to provide an inner ring of the type described, in which distortion is minimized and the possibility of crystallization is eliminated.

Third, to provide an inner ring of the type described, which is characterized by an equalized outward radial pressure against the outer ring.

Fourth, to provide an inner ring of the type described, which improves oil drainage and secures free flexing action at high speeds.

Fifth, to provide an inner ring of the type described, characterized by a wear resisting coating of chromium or other hardening agent.

Further objects relating to details and economies of my invention will definitely appear from the description to follow. The invention is defined in the claims.

A preferred embodiment of my invention is illustrated in the accompanying drawing, wherein:

Fig. 1 is a fragmentary elevational view of a piston and outer rings partially broken away and sectioned to illustrate the operative relation of my improved inner ring thereto.

Fig. 2 is an enlarged sectional view on a line corresponding to line 2—2 of Fig. 1, further illustrating the relation of the parts in use.

Fig. 3 is an edge view of my improved inner ring.

Fig. 4 is an enlarged perspective view illustrating the details of my inner ring.

Fig. 5 is a fragmentary perspective view illustrating one manner of inserting my inner ring beneath an outer ring, which is facilitated by details of the construction of my ring.

It is realized by those familiar with the art that the main functions of an inner expanding ring, when employed in connection with an outer compression, scraper or oil ring, is to centralize the piston and rings in the cylinder and thereby prevent piston rock and slap which are damaging to the piston, cylinder and rings and to increase the tension of the outer ring and compensate for cylinder wear. The problem connected with the designing of an inner ring which would perform its functions in the best manner has long engaged the attention of piston ring engineers. My improved ring, as set forth in the present application, performs the functions above noted in a highly satisfactory manner and it is further characterized by other advantageous features which will be hereinafter specifically referred to.

In the drawing, the reference numeral 1 indicates the piston of an internal combustion or other engine, provided with compression, scraper, and oil rings numbered 2, 3, and 4, respectively.

The rings are centered with respect to the piston, hence the piston is centered with respect to the cylinder wall 5 by providing one or more of the outer rings with an inner expanding ring 6 lying between the outer ring and the bottom wall 7 of its ring groove.

Referring to Figs. 3 and 4, my inner ring 6 consists of a split band of flexible spring steel formed in the general shape of a polygon having the angles or crimps 8 thereof rounded or bowed. The ends of the ring terminate in outwardly bent or directed lips 9. Each of the crimps 8 consists of an arcuate convexly bent portion 9, which is adapted to engage against the inner side of the outer piston ring, and a reversely or concavely bent portion 10, which joins the crimp to the adjoining straight sections or reaches 11.

The straight sections or reaches 11 of the polygon are adapted to lie against the bottom 7 of the piston groove, as clearly illustrated in Fig. 2, and are provided with staggered upper and lower recesses or scallops 12 which facilitate the flow of oil from the groove to the interior of the piston through the conventional passages 13 formed in the piston wall. Needless to say, the formation of the scallops 12 has a tendency to weaken the ring at the point where they occur. However, the tendency to rupture due to the weakening effect is effectively combated or overcome by the reverse arcuate portion 10 which, as illustrated in Fig. 2, contacts the bottom of the groove at 14, whereby the flexing action of the ring 8 is borne by the full width of the inner ring. The cusps or raised arcuate portions 9 thrust outwardly against the inner side of the ring 4 to centralize it and maintain it in sealing engagement with the cylinder wall.

An important feature of my invention lies in the fact that I plate ring 8 with chromium or other wear resisting metal, thereby enabling the use of a considerably thinner band than would otherwise be possible and greatly lengthening the life of the ring. The chromium plating is preferably uniformly applied over the entire surface of the ring by the electroplating process.

The joint or gap 15 is so placed in my ring that the outwardly bent ends or lips 9 adjacent the gap lie between crimps 8. By locating the gap at this portion of the ring, an important advantage is secured, since a round smooth surface is provided for the ends of the ring to slide against the bottom 7 of the groove. Equalized pressure over the entire circumference of the ring is achieved. At the same time, the insertion of my rings 8 underneath the outer rings 2, 3, or 4 is made possible without the removal of the outer rings from the grooves, in the manner illustrated in Fig. 5. The outwardly bent lip 9 is inserted under a free end 16 of the outer ring, whereupon the inner ring is worked circumferentially around the piston until it assumes its proper location. This has not heretofore been possible or practicable with inner rings having conventional plain ends.

The ventilating recesses or scallops 12 adjacent the gap 15 are preferably omitted and the band terminated at its ends in full width. I have found that the cutting of the gap in the ring reduces the tension of the spring at that portion a certain amount. In other words, if the inner ring were not cut through at the gap, the spring material would have a certain amount of resilience or resistance to pressure that it does not have when cut, since the ends are free to slide in the groove under compressing stress. Likewise, in ventilating the inner ring by cutting of recesses or scallops in it, the total tension is reduced materially. Accordingly, by leaving the ring in its original thickness adjacent the gap, the lessening of ring tension at the gap is equalized so that the tension of my ring at any point in its periphery is substantially the same as that at any other point.

The crimp 8 characterizing my improved ring is not simply an angular bend in a band of material, but actually has three distinct bends for every crimp. The three distinct bends raise the height of the ring sufficiently to insure perfect action in the deepest standard groove, while for shallow grooves the inner ring is automatically compressed to the right height by the outer ring when installed in the cylinder. In other words, my improved inner ring, characterized by the novel crimps 8, provides the necessary amount of tension and centralization without extreme friction, heat, or power loss.

In the second place, my improved crimp design secures a longer arc contact on the outer ring and piston, thus distributing the flexing action over a much greater part of the inner ring. Because of this greater distribution of the flexing action, distortion is minimized and the possibility of crystallization is eliminated. Instead of having all the wear occur on the sharp corner of the crimp, as in conventional practice, my ring distributes the wear over a wider area and therefore, while it will be under wearing stress at the crimp, the tendency to wear is much slower than ordinarily. However, the tendency to wear which exists is counteracted effectively by the chromium plated or otherwise hardened surface of the rings, which additionally makes it possible to utilize a substantially thinner stock.

Because of the nature of the crimps 8 of my improved inner ring, it is possible to locate the gap midway between two of the crimps, and this location of the gap, together with the other features which have been referred to, makes my ring one which exerts an equalized outward radial pressure over the entire circumference of the outer ring and results in a properly centralized piston head. It has been found that the placement of the gap at one of the crimps, rather than between a pair of them, results in a tremendous pressure variation throughout the entire circumference of the outer ring. In effect, it is similar to the removal of one of the crimps inasmuch as there is practically no pressure at the crimp in which the gap is placed. Hence, the location of the gap as disclosed contributes materially to the efficiency of my ring.

Due to the efficiency attributable to my inner ring and its crimp design, it is possible to reduce the width of the inner ring and still secure the desired tension and maintain piston centralization, which prevents piston rock and slap. Reduction of the width of the ring makes for increased oil drainage, since there is less obstruction back of the outer ring, and the oil drainage capacity of installations embodying my ring is also increased by the unusually large scallops, which feature my invention, without affecting the tensional efficiency or strength of the inner ring. Likewise, the possibility of reducing the width of the inner ring makes possible a freer acting inner ring or one which floats in the groove, thus securing a freer flexing action at high speeds.

Fig. 1 illustrates an oil ring 4 broken away to make clear the relation of my inner ring thereto. However, it will be understood that my ring is susceptible of and is intended for similar functions with respect to the compression and scraper rings 2, 3, and I do not wish to be limited in this regard.

I have illustrated and described my improvements in an embodiment which I have found very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. An inner expanding ring for an outer piston ring in a piston groove, comprising a thin flexible steel band provided with a wear resisting coating of chromium, said band being shaped to surround the piston in the groove therein, and having a plurality of crimps adapted to engage the inner side of the outer ring, said crimps each comprising a central bent convex portion and adjacent reversely bent concave portions on either side of said central portion, a straight portion joining said concave portions, said central portion being adapted to contact said outer ring, and said reversely bent and straight portions being adapted to contact the bottom of said groove, whereby the piston is centered in the cylinder for the piston, and a plurality of oil drainage scallops spaced around said band in staggered order.

2. An expander for a piston ring adapted to surround a piston comprising a thin flexible band of steel having spaced arcuate crimps around the same, said band being scalloped on its upper and lower edges between said crimps to provide oil drainage passages, said band having piston engaging portions between said crimps, said portions being joined to said crimps by portions bent in a direction reverse to the direction of bend of the crimps whereby the ring may be centered about the piston, said band being of full width between the ends of the band and the crimps immediately adjacent thereto.

3. An inner piston ring expander comprising a thin flexible steel band adapted to surround a piston in a groove therein, said expander having spaced crimps comprising an outwardly bent ring engaging arc, an inwardly bent portion on either side of said arc, and upper and lower staggered oil drainage recesses between said portions, said band terminating in lips lying between a pair of said crimps and said band being of full width between said last named crimps and said lips.

HAROLD P. PHILLIPS.